3,198,637
PREPARATION OF FILLED BAKED PRODUCTS AND FILLER COMPOSITION UTILIZED THEREIN
Meade C. Harris, Rutherford, and William J. Merrell, Clifton, N.J., assignors to National Biscuit Company, a corporation of New Jersey
No Drawing. Filed Feb. 18, 1963, Ser. No. 259,380
10 Claims. (Cl. 99—86)

The present invention relates in general to foodstuffs and more particularly to baked products of the sweet variety. Many commercial foodstuffs, cookies, cakes and in general biscuit products have either a topping or a layer of icing or a coating or a filler between two layers of dough in a sandwich fashion. These fillers or coatings or toppings may be of a variety of colors, usually pink, white, yellow and also of chocolate color.

In the manufacture of icings and fillers, it is necessary to use such a formula that a satisfactory gloss will be obtained after drying and that the filler or coating will remain soft on storage.

The essential ingredients of a conventional icing are sugar and water, to which a binder is added, such as for instance gelatin, which controls the spreading and holds a sufficient amount of air necessary to give lightness to the products. Some formulations use a small amount of shortening, such as plastic butters and all-hydrogenated shortenings to impart shortness and tenderness to the product. Conventional fillers on the other hand comprise a substantial proportion of sugar and shortening, the type of shortening being determined by the type of goods desired, a solid fudge filling requiring a liquid or melted fat, and a fluffy cream filling requiring a plasticized fat.

Conventionally these cookies, cakes are prepared by baking the dough first either in the form of the finished goods or as a continuous sheet, and then applying the cream or filling or icing before packaging. The step of baking first has been the normal practice in the baking industry. The reason has been that if the filler or coating or icing were applied before baking, it would darken, become brittle, and the finished goods could not be sold because of poor appearance and poor taste. Also in the case of the icings in which the basic ingredients are sugar and water, the composition used as icing would melt during baking.

The greater labor and manufacturing cost involved in applying the filler or icing after the cookies, cakes and in general biscuit products have been baked, is obvious if one only considers the longer time involved in the manufacture. In the conventional processes, it has been necessary after baking the goods, to cool them before applying the icing or filler. The cooling time and the separate step of applying the icing or filler obviously involve substantial tie-up of equipment and additional cost.

An effort has been made for a long time to develop some formulations which could be applied before baking, and which would at the same time retain the flavor, mouth feel, and the tenderness of ordinary fillers and icings. All these attempts to our knowledge have been unsuccessful because on baking the filler or icing composition shrinks and makes the good unsalable due to both poor appearance and poor flavor.

In our experience, some improvement was achieved with a formulation containing sugar, water, a small amount of sodium hydroxide to adjust the medium above neutrality, and a small amount of albumen, as a binder. The use of the albumen instead of gelatin was advantageous because only one-third of binder was required, and the composition was suitable to be applied to biscuit products still hot.

This composition however was still far from satisfactory if applied to goods before baking, because it did not permit normal release of moisture from the base of cake or dough and a gummy and sticky layer formed at the contact line between the dough and the topping composition. This disadvantage was also manifest when the composition was interposed between two layers of dough or cookie sheet in a sandwich fashion. In order to use this formulation, it would have been necessary to use special ovens, for instance radio frequency ovens which allow the moisture to evaporate more thoroughly, and which dry without baking or browning. However, this formulation was abandoned in view of its limited applications, and necessity of additional equipment.

It is an object of the present invention to provide a new and useful composition suitable as icings, fillers, and coatings for biscuit products and which may be applied before baking.

Another object is to provide a filler or icing composition which retains the appearance and flavor of icings and fillers, and which does not darken on baking.

Still another object is to prepare a new composition which expands on baking, and which acts as a connecting element for the other sections of dough, in the finished product.

Another object is to provide a new method for the application of the novel composition and for the preparation of sweet goods comprising a dough and the composition of the invention, ready for baking.

Another object is to provide new sweet goods which have the novel composition of the invention interposed between several sections of dough, to provide a layering or striped effect.

Another object is to provide novel sweet goods constituted of just two strips, one of dough and one of the novel composition of the invention in the same or in contrasting color.

Another object is the preparation of a composition which comprises the essential ingredients of icings as well as fillers and which may be used to replace both conventional icings and fillers, in all varieties of commercial products.

Still an additional object is to provide a new composition which may be baked, cut in pieces and is of attractive appearance and high palatability to be eaten as such. Thus an object of this invention is to provide confections which contrary to other varieties of the confectionery industry, are baked instead of being cooked.

Another object is to provide a new composition which may be combined with different coloring and flavoring agents, in accordance with each specific formulation and different kinds of goods.

In accordance with the present invention, a composition has been found which may be shaped to any desired form, with or without other sections of dough, and which retains its shape on baking. Surprisingly it has been found that essentially the same ingredients used by the housewife to make an icing, that is sugar and water, will, when a shortening is incorporated in accordance with the invention in substantial proportion, and a binder, provide a formulation which may be baked. Thus the composition of the invention is intermediate between an icing and a filler because it comprises sugar, a high proportion of shortening, water and a binding agent.

Any edible oil or fat may be used, of animal or vegetable origin or even a mixture of animal and vegetable fats. Butter is excellent as a fat but it is not sufficiently stable, and it is preferable to use in whole or in part an hydrogenated oil if stability of the finished goods is a critical factor. Modified oils produced by hydrogenation and interesterification are very satisfactory, since they are bland, white, and of very smooth texture, of good stability and good creaming quality.

The binding agent may be either flour or starch.

Flour is wheat flour, usually with a protein content not above 9% and preferably between 7.5 and 8.5%. Starch of any origin may be used, wheat, corn, barley and oats. The choice of either flour or starch or the amounts of both depends on the particular type of finished products. Flour due to its protein content has the tendency to darken on baking, while starch has more gelatinous properties, sets faster and gives more body to the finished goods. On the other hand starch has less flavor than flour and a formulation containing all starch and no flour would be flat in taste. Although either flour or starch may be used, it has been found that the total amount of binder should be 180 parts per 400 parts of sugar. Thus it is possible to have 180 parts of either flour or starch or any combination of flour and starch provided the total amount is 180 parts.

Sugar must be refined sugar, powdered or finely granulated, for instance 4X sugar. Salt develops and brings out the flavor of the composition of this invention, but it should be finely ground, because of the small size of the crystals improves the rate of dissolution. The amount of salt may be varied according to the individual formulation between zero and 6 parts, although 2 parts of salt are preferred for a composition of 400 parts of sugar. The amount of water may be varied, between 20 and 130 parts, for the basic composition containing 400 parts of sugar.

The amount of shortening may be varied in accordance with the invention, between 40 and 175 parts, for a formulation containing 400 parts of sugar.

It is to be understood that the proportions of the ingredients may be changed within the range given, according to the type of goods and the nature of the finished product. If the composition is to be applied to goods already baked, the amount of water is preferably increased up to 130 parts per 400 parts of sugar, and the shortening is decreased to only 40 parts.

In the case of the fillers which are interposed between two sections of dough, prior to baking, we have found that a composition approaching the conventional filler, that is with a substantial proportion of shortening is advantageous, and is suitable for use before baking, provided some water, as in a conventional icing, is added. Although the range of the ingredients may be varied still giving satisfactory results, the preferred embodiment of the invention, resides in the combination of 400 parts of sugar, 150 parts of flour, 30 parts of starch, 150 parts of shortening, 2 parts of salt and 40 parts of water. Optional ingredients such as corn syrup, flavoring agents, and coloring agents may be added, as long as they can withstand baking, do not darken and do not affect the properties of the formulation.

The ingredients may be combined according to any of the conventional mixing procedures for fillers. For instance according to one procedure, the sugar, salt and shortening are combined, then water is added, finally flour and starch, and all the ingredients are mechanically blended for 10 to 15 minutes at a speed of 40 r.p.m.

The composition of the invention may be applied to cookies and cakes of any shape, and size for instance rectangular, oval or round and it may also be used with a cake dough or sheet suitable to be rolled, before baking. Although the amount of diluent, namely water is low, at the most 130 parts for the total blend, the composition of the invention is sufficiently soft to be extruded through an orifice and with proper extrusion devices may be adapted for use in continuous processes for the manufacture of sweet goods.

As the dough, one may use any of the conventional sweet goods formulations, the choice depending on the nature of the finished goods desired, and the color desired. One may also use dough containing cocoa or a cocoa substitute with the flavor and appearance of chocolate dough. A formulation which has been found satisfactory for vanilla dough consists of 100 pounds of flour, 35 pounds of sugar, 18 pounds of shortening, 5 pounds of invert syrup, 2 pounds of eggs, 1.5 pounds of non-fat milk solids, 1 pound of salt, one-half pound of sodium bicarbonate, one-quarter of pound of flavor, chiefly vanilla and 15 pounds of water.

A good chocolate formula contains 100 pounds of flour, 40 pounds of sugar, 8 pounds of Dutch cocoa (dark), 5 pounds of light cocoa, 18 pounds of shortening, 1.5 pounds of non-fat dry milk, 1 pound of salt, 1 pound of sodium bicarbonate, 1.5 pound of flavoring agents and 23 pounds of water.

If a striped effect is desired, a process has been devised which allows the preparation of any goods from two to any desired number of strips. An extrusion apparatus is used with at least two and preferably a plurality of orifices. Dough and the composition of the invention are extruded from the two or alternate orifices so that the filler is arranged intermediate between the dough, or occupies one-half of the finished goods in the case of only two stripes. Filaments are formed of any desired diameter, according to the heads of the orifices. By suitably arranging the orifices, the filaments fall on the band of the oven in juxtaposition one to the other. If necessary it is possible to apply laterally gentle pressure to hold the filaments side by side, and yet maintain their separate identity in color and composition. The continuous band of filaments of dough and filler composition may be either cut into pieces, and then baked, or baked first. The latter procedure, that is cutting after baking is more convenient.

The new filler composition withstands a temperature of 350° to 450° F. for as long as 15 minutes. The baking temperature and length of time are preselected in accordance with each desired formulation of dough, and with variations within the range given above for all the ingredients of the filler composition. Baking 8 minutes at 400° F. is usually sufficient.

After baking, cutting may be effected transversely to the direction of filaments to give square or rectangular pieces with a striped effect or if desired, cookies of a variety of preselected shapes may be obtained, by using appropriate cutters.

The finished goods have the appearance of cookies with dough sections, separated by filler sections usually of contrasting color. Thus the filler may be interposed as white stripes between strips of chocolate dough giving a very attractive striped effect.

By suitable choice of the orifice head, and using an oscillating head or an oscillating band, it is possible to cause the strips of dough and of the composition of the invention to deposit in an undulated fashion, thus providing an additional novel attractive variety of cookies.

It is also possible to deposit a layer of the composition prepared according to this invention over a layer of dough and then roll them together. The roll is then sliced to provide pin-wheel cookies which are conveniently baked flat.

The composition of this invention may be baked as such and cut into pieces providing a novel variety of confections which are baked rather than cooked. With different coloring and flavoring agents, a variety of new baked confections is obtained, which may also take any desired shape or size.

The composition of the invention expands during baking, in amount of 10% of its original volume in the preparations where a filament of the composition is interposed between two filaments of dough to a maximum of 20% in the case where the composition is baked without dough, to be used as baked confections.

As colors, the colors approved by the Food and Drug Administration, known as F.D. & C. colors, may be used, and any combination of same.

The following examples are given by way of illustration:

*Example 1*

A filler composition was prepared by mixing 400 parts of sugar, 150 parts of shortening and 2 parts of salt. To the blended ingredients 40 grams of water and then 150 parts of flour and 30 parts of starch were added. The ingredients were mixed in a mixer revolving at 40 r.p.m. and the composition was placed in an extrusion apparatus, having seven orifices, of size suitable to give filaments of ¼ in. diameter. The orifices were so arranged that the filler was extruded from three non-adjacent non-external orifices, intermediate between the dough. Chocolate dough prepared from shortening, flour, sugar, dark and light cocoa, salt, sodium bicarbonate, milk powder, flavors and water, according to the formulation indicated above, was extruded from the other four non-adjacent orifices. The extruded filaments of ¼ in. diameter fell on the band sufficiently close to touch each adjacent filament, and to form a sheet with alternately brown and white strips. The sheet was baked at 400° F. for 8 minutes and then sliced transversely to the direction of the filaments to provide rectangular pieces about two inches in length and almost 2 inches in width. The finished products retained their striped appearance and the white filler composition did not darken on baking. The new composition of the invention expanded slightly during baking, with each strip of filler connecting the two adjacent strips of dough. By using a variety of cutters the finished goods were obtained in a round, oval, triangular, star and heart shape.

*Example 2*

The same composition described in Example 1 was prepared but F.D. & C. Red No. 4 was added. The dough was prepared from flour, sugar, shortening, invert syrup, milk solid, vanilla, eggs, salt, sodium bicarbonate, and water according to the formulation indicated above. The results were the same as in Example 1, namely after baking, the finished goods retained their pink color, and the filler did not darken.

*Example 3*

The same composition described in Example 1 was pre- in Example 1. The finished goods after baking consisted of two strips of chocolate dough about ⅜ in. in width each and one intermediate strip of white filler also ⅜ in. in width. This appearance was achieved by either of two processes which were equally satisfactory. According to one process, only three orifices of the apparatus described above in Example 1 were used with different heads, two for the dough and the other for the filler in the middle between the two orifices to provide for two filaments of dough and one of filler each ⅜ in. in diameter, side by side to the other. The other process consisted of using a total of six orifices but using two pairs of adjacent orifices for the dough and the other two intermediate orifices for the filler. The two filaments of dough at both ends and the two filaments of filler in the middle merged, on baking, still maintaining the separation of the two chocolate dough strips and the intermediate white filler strip. The goods were sliced transversely as in Example 1 and baked at 375° F. 8 minutes.

*Example 4*

The composition was prepared as in Example 1, and 40 parts of water was used. It was extruded from one orifice head, while chocolate-flavored dough, prepared as in Example 1, was extruded from an adjacent orifice head. Two filaments deposited side by side on the band, of diameter ⅜ inch, one white and the other chocolate color. The sheet was baked 10 minutes at 375° F. and then cut transversely. The white strips expanded mostly laterally to a width a little less than one-half inch. By using a variety of cutters, the finished goods were obtained in a round, oval, triangular, rectangular, heart and star shape.

*Example 5*

The composition prepared according to Example 1 was colored with a raspberry-color by combination of F.D. & C. Red No. 2 and Blue No. 1, or F.D. & C. Violet No. 1. The composition was extruded over a band to form a sheet ¼ in. in thickness, which was baked at 375° F. for 8 minutes. The sheet was then cut to provide pieces about one inch square. They were attractive in appearance and taste, providing a novel variety of confections which are baked, rather than being cooked. The finished goods could be obtained in a variety of shapes according to the cutter selected.

*Example 6*

A sheet of chocolate dough was prepared as in Example 1 from shortening, flour, sugar, dark and light cocoa, salt, sodium bicarbonate, milk powder flavors and water. The composition of filler, prepared according to Example 1, was extruded to form a sheet over the chocolate dough. By rolling motion, the two layers were rolled together, pressed gently and the roll was then sliced, to provide pin-wheel cookies of ¾ in. width. They were baked as in Example 1.

*Example 7*

Three adjacent strips were allowed to deposit on the band, two of chocolate dough and one of the composition prepared according to Example 1. By a gentle oscillating motion of the orifice head, the strips deposited in a wavy form. The continuous sheet of undulated strips thus formed was sliced and the individual cookies baked as in Example 1.

From the foregoing, it will be apparent that one advance in the art has been made available by this invention, and that a composition is provided suitable to be baked, which does not darken nor shrink on baking, and which may be used to replace compositions which in the art had been applied only after baking. It is also obvious that a process is provided for the preparation of sweet goods with a striped effect or pin-wheel or undulated strips. Persons skilled in the art will readily visualize that other embodiments of the invention may readily be manufactured. The filaments may be extruded to predetermined contours and the finished goods may have a variety of shapes, colors and contrasting colors.

Thus the present invention may be embodied in other specific forms in addition to the illustrations given and reference is made to the appended claims as indicating the scope of the invention.

What is claimed is:

1. An edible composition for use as a filler and icing for sweet goods and capable of being baked, which comprises 400 parts of sugar, shortening in amount between 40 and 175 parts, 180 parts of a binding agent, which is a member selected from the group consisting of starch and flour and combinations thereof, water between 20 and 130 parts, salt up to 6 parts, said composition expanding on baking in an amount between 10 and 20% of the original volume and being capable of withstanding a baking temperature of 350 to 450° F. for 15 minutes, and retaining its color on baking.

2. The edible composition according to claim 1 wherein the amount of starch is 30 parts and the amount of flour is 150 parts.

3. The composition according to claim 1 wherein the amount of water is 40 parts and the amount of shortening is 150 parts.

4. The method of preparing a composition suitable as filler and icing for sweet goods and capable of withstanding baking at a temperature of 350°–450° F. for 15 minutes, which comprises the steps of mixing 400 parts of sugar, with shortening in an amount between 40 and 175 parts, salt in an amount up to 6 parts, to form a first mix, then adding between 20 and 130 parts of water, separately adding 180 parts of a member selected from the group consisting of flour and starch and combinations thereof, and blending said ingredients.

5. The continuous method of preparing sweet goods having a striped effect which comprises the steps of extruding a dough material to form a continuous filament of said dough, continuously extruding a filler composition which is suitable to be baked, said filler composition consisting of 400 parts of sugar, 150 parts of shortening, 2 parts of salt, 40 parts of water, 150 parts of flour, 30 parts of starch, continuously aligning said dough filament and said filler composition in edge-to-edge relationship, continuously moving said dough and said filler in a linear direction, continuously baking said dough and filler simultaneously at 350° to 450° F. for a period of time not exceeding 15 minutes, to provide a longitudinally striped bar of baked material, and cutting transversely according to preselected size and shape.

6. The method according to claim 5 wherein said dough material is extruded from a plurality of orifice heads and said filler composition is extruded from a plurality of orifice heads interposed between said dough orifice heads, to provide a plurality of filaments of dough alternated by filaments of said filler composition, lying side by side in a continuous sheet.

7. The method according to claim 5 wherein said filaments of dough lie at the periphery of said sheet and said filaments of filler composition lie intermediate between said filaments of dough.

8. The method according to claim 5 wherein said strips are deposited in an undulated fashion and said sweet goods after baking comprise one undulated strip of dough, and one undulated strip of filler.

9. The method according to claim 6 wherein said strips are deposited in an undulated fashion.

10. The composition according to claim 1, additionally comprising at least one additive which is a member selected from the group consisting of corn syrup, flavoring agents, and coloring agents.

References Cited by the Examiner

UNITED STATES PATENTS

| | | | |
|---|---|---|---|
| 2,888,887 | 6/59 | Wolf | 99—86 X |
| 2,963,373 | 12/60 | Monti et al. | 99—139 X |
| 2,998,318 | 8/61 | Forkner | 99—86 |
| 3,056,678 | 10/62 | Pentzlin | 96—86 |

OTHER REFERENCES

Rombauer et al.: "The Joy of Cooking," The Bobbs-Merrill Co., Inc., New York, 1953, page 684 relied upon.

A. LOUIS MONACELL, *Primary Examiner.*
BEATRICE H. STRIZAK, *Examiner.*